United States Patent [19]

Chien et al.

[11] Patent Number: 5,525,690
[45] Date of Patent: Jun. 11, 1996

[54] PROCESS FOR THE PREPARATION OF A POLYOLEFIN AND SYNDIOTACTIC POLYPROPYLENE

[75] Inventors: James C. W. Chien; Marvin D. Rausch, both of Amherst, Mass.

[73] Assignee: Solvay (Société Anonyme), Brussels, Belgium

[21] Appl. No.: 286,444

[22] Filed: Aug. 5, 1994

[51] Int. Cl.⁶ .............................. C08F 4/642; C08F 10/06
[52] U.S. Cl. ...................... 526/160; 502/103; 502/117; 526/129; 526/134
[58] Field of Search .................................. 526/133, 160

[56] References Cited

U.S. PATENT DOCUMENTS

| 4,892,851 | 1/1990 | Ewen et al. | 526/160 |
| 5,132,381 | 7/1992 | Winter et al. | 526/160 |
| 5,225,500 | 7/1993 | Elder et al. | 526/160 |

FOREIGN PATENT DOCUMENTS 3907965  9/1990  Germany .

OTHER PUBLICATIONS

"Syndioselective Propylene Polymerization Catalyzed by rac–2,2–Dimethylpropylidene (1–$\eta^5$–cyclopentadienyl) (1–$\eta^5$–fluorenyl) dichlorozirconium", Ricardo Fierro et al., Journal of Polymer Science, vol. 32, No. 4, Mar., 1994, pp. 661–673.

*Primary Examiner*—Edward J. Smith
*Attorney, Agent, or Firm*—Spencer & Frank

[57] ABSTRACT

A process for the preparation of a polyolefin by polymerization of at least one olefin, the said process comprising contacting the at least one olefin with a catalytic system comprising a metallocene and a cocatalyst, wherein the metallocene is selected from the group consisting of rac-2,2-dimethylpropylidene(1-$\eta^5$-cyclopentadienyl)(1-,$\eta^5$-fluorenyl)dichlorometallocene of titanium, zirconium, hafnium and vanadium.

Syndiotactic polypropylene having a melting temperature $T_m$ from 95° to 160° C., a syndiotactic pentad fraction [rrrr] from 0,91 to 0,96, a crystalline fraction $f_C$ from 25 to 50% and a viscosity-average molecular weight $M_v$ from 60,000 to 200,000.

8 Claims, No Drawings

PROCESS FOR THE PREPARATION OF A POLYOLEFIN AND SYNDIOTACTIC POLYPROPYLENE

FIELD OF THE INVENTION

The present invention relates to a process for the preparation of a polyolefin by polymerization of an olefin with the aid of a metallocene type catalyst. The invention also concerns syndiotactic polypropylene which can in particular be obtained by the aforementioned process.

TECHNOLOGY REVIEW

The patent application DE-A-3907965 discloses (example 12) a process for the preparation of syndiotactic polypropylene in the presence of a catalytic system comprising dimethylmethylene(1-$\eta^5$-cyclopentadienyl)(1-$\eta^5$-fluorenyl)dichlorozirconium and methylaluminoxane at a polymerization temperature of 50° C.

This known process is characterized by a low catalytic activity resulting in a low productivity of polypropylene and a high content of catalytic residues in the obtained polypropylene.

The present invention aims to overcome this drawback by supplying a new polymerization process using a catalytic system with a high catalytic activity.

SUMMARY OF THE INVENTION

Consequently, the invention relates to a process for the preparation of a polyolefin by polymerization at least one olefin, the said process comprising contacting the at least one olefin with a catalytic system comprising a metallocene and a cocatalyst, wherein the metallocene is selected from the group consisting of rac-2,2-dimethylpropylidene(1-$\eta^5$-cyclopentadienyl)(1-$\eta^5$-fluorenyl)dichlorometallocene of titanium, zirconium, hafnium and vanadium.

According to the invention "polyolefin" denotes a homopolymer of an olefin or a copolymer of an olefin with one or more comonomers.

DETAILED DESCRIPTION OF THE INVENTION

The catalytic component rac-2,2-dimethylpropylidene(1-$\eta^5$-cyclopentadienyl)( 1-$\eta^5$-fluorenyl)dichlorometallocene used in the invention process and called "metallocene" hereafter corresponds to the following structural formula:

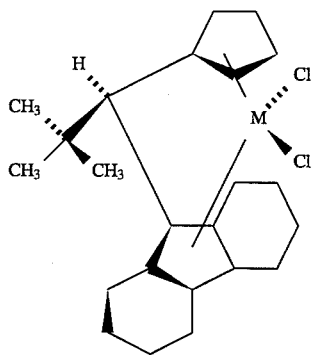

wherein M denotes a metal chosen from titanium, zirconium, hafnium or vanadium. The best results are obtained with zirconium. The metallocene can be obtained according to the procedure described in "Ansa-Titanocen- und Zirconocenkomplexe mit asymmetrisch substituierter Kohlenstoffbrücke", Journal of Organometallic Chemistry, Vol. 401, C5-9 (1991).

The metallocene can be used in the form of a powder or in the form of a solution in an aromatic solvent such as benzene and its derivatives, for example toluene, or polycyclic aromatic hydrocarbons in which each ring may be substituted, or their mixtures. Preferably a solution of the metallocene is used. A solution in toluene is very well suited. As a variant, the metallocene can be deposited on an inorganic or a polymeric support. Examples of inorganic supports are mineral oxides such as oxides of silicon, aluminium, titanium, zirconium, thorium and their mixtures, mixed oxides of these metals such as aluminium silicate and aluminium phosphate, and halogenides such as magnesium dichloride. Examples of polymeric supports are polymers of olefins, in particular homopolymers and copolymers of ethylene and propylene. Preferably, the polymeric support comprises particles having a mean particle size from 5 to 350 μm and being characterized by a porous volume generated by pores of radius from 1000 to 75000 Å of at least 0,2 cm³/g.

The cocatalyst used in the process according to the invention can be any cocatalyst capable of activating the metallocene. The cocatalyst can be for instance an aluminoxane. The aluminoxane may be chosen from the linear compounds of formula:

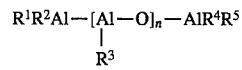

and the cyclic compounds of formula:

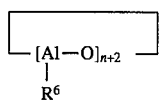

in which $R^1$, $R^2$, $R^3$, $R^4$, $R^5$ and $R^6$ each represent an group containing up to 18 carbon atoms, preferably up to 12 carbon atoms, and $1 \leq n \leq 50$. Preferably n is at least 15 and at most 30, in particular from 20 to 25.

Methylaluminoxane is preferably used. The aluminoxane can optionally be dissolved in an organic solvent such as the ones described before.

The quantity of aluminoxane used in the process according to the invention depends on the quantity of metallocene used and is generally such that the molar ratio Al/M is at least equal to 500, especially at least 1000; the molar ratio Al/M is currently at most equal to 4000, in particular at most 3500.

As a variant, the cocatalyst can comprise simultaneously an ionizing agent and an organometallic compound. The organometallic compound has the function of replacing the chloride atoms in the metallocene at least partially by hydrocarbon radicals, the so converted metallocene being then ionized by the ionizing agent. An ionizing agent is understood to denote a compound comprising a first part which has the properties of a Lewis acid and which is capable of ionizing the converted rac-2,2-dimethylpropylidene(1-$\eta^5$-cyclopentadienyl)( 1-$\eta^5$-fluorenyl)dichlorometallocene and a second part which is inert towards the ionized zirconocene. The ionizing agent may be an ionic compound comprising a cation having the properties of a Lewis acid, and an anion constituting the second abovementioned part of the ionizing agent. Organoborates are anions which have led to very good results. Organoborate is understood to denote a boron derivative in which the boron atom is linked to 4 organic substituents. Examples of ironic ionizing agents which may be mentioned are triphenylcarbenium tetrakis(pentafluorophenyl)borate, N,N-dimethylanilinium tetrakis(pentafluorophenyl)borate and tri(n-butyl)ammonium tetrakis(pentafluorophenyl)borate. The preferred cationic Lewis acids are carbenium, sulphonium and oxonium. The very particularly preferred ionizing agents are those comprising a cation of carbenium type.

As a variant, the ionizing agent may also be a nonionic compound having the properties of a Lewis acid which is capable of converting the metallocene into a cationic metallocene. To this end, the ionizing agent is itself converted into an anion which is inert towards the cationic zirconocene which is capable of stabilising the latter. Examples of nonionic ionizing agents which may be mentioned are tri(pentafluorophenyl)boron, triphenylboron, trimethylboron, tri(trimethylsilyl)borate and organoboroxines.

The ionizing agent is preferably triphenylcarbenium tetrakis(pentafluorophenyl)borate.

The organometallic compounds used in combination with the ionizing agent are generally derived from a metal chosen from-groups IA, HA, IIB, HA and IVA of the Periodic Table. They may be selected from organometallic compounds of lithium, magnesium, zinc, aluminium or tin. The best results are obtained with organoaluminium compounds optionally comprising oxygen and/or a halogen. Examples which may be mentioned are trialkylaluminium compounds and alkylaluminium compounds comprising at least one alkoxy group. The organoaluminium compounds advantageously correspond to the general formula AlTT'T" in which the groups T, T' and T''' each denote an optionally substituted alkyl, alkenyl, aryl or alkoxy group containing up to 20 carbon atoms. This may for example be trimethyl-, triethyl-, triisopropyl-, triisobutyl-, trihexyl-, trioctyl- and tridodecylaluminium. Triethylaluminium and tdmethylaluminium are particularly suitable. Trimetylaluminium is preferred.

The process according to the invention is usually carded out in a polymerization reactor wherein at least one olefin, the metallocene and the cocatalyst are brought into contact optionally in the presence of other constituents participating in the polymerization reaction such as a molecular weight regulator (for example hydrogen or diethylzinc) or an inert constituent such as a diluent.

The polymerization may either be carded out in solution, in suspension or in the gas phase, and may be carded out continuously or discontinuously, for example by carrying out a polymerization in suspension in a first reactor followed by a polymerization in the gas phase in a second reactor or by working in the gas phase in two consecutive reactors. As a variant, the polymerization may also be carded out in several reactors arranged in series, the temperature and/or the pressure in the first reactor being different from those prevailing in the other reactors.

The polymerization is advantageously carded out in solution in the liquid olefin, which process is well known to the man skilled in the art.

The polymerization is often carried out in suspension in a hydrocarbon diluent. A suspension in a hydrocarbon diluent is understood to denote a liquid medium wherein at least 80% (preferably at least 95%) of the polyolefin formed is insoluble therein. The hydrocarbon diluent may be chosen from liquid aliphatic, cycloaliphatic and aromatic hydrocarbons. Useful diluents are aromatic hydrocarbons such as benzene and its derivatives, for example toluene, or polycyclic aromatic hydrocarbons in which each ting may be substituted, or their mixtures. Toluene is suitable.

Other useful diluents are aliphatic hydrocarbons such as hexane or isobutane. Hexane is particularly suitable.

In the case of a suspension polymerization, the polymerization temperature is generally at least equal to −20° C., preferably at least −10° C., the values of at least 0° C. being particularly recommended. The temperature is commonly at the most equal to 80° C., preferably at the most 70° C., temperatures of at the most 60° C. being advantageous. Temperatures from 30° to 60° C. are particularly preferred.

The olefins used in the process according to the invention may be selected from those containing up to 20 carbon atoms per molecule. The olefins contain advantageously up to 12 carbon atoms per molecule and are, for example, chosen from ethylene, propylene, 1-butene, 1-hexene, 3-methyl-1-butene and 4-butyl-1-octene. The olefin is preferably ethylene or propylene. The best results are obtained with propylene. The process according to the invention may be used for the homopolymerization of one of the aforementioned olefins or for the copolymerization of one of the aforementioned olefins with one or more comonomers. The comonomers may be various materials. They may be monoolefins containing up to 8 carbon atoms (for example 1-butene, 1-pentene, 3-methyl-1-butene, 1-hexene, 3- and 4-methyl-1-pentenes and 1-octene) or diolefins comprising from 4 to 18 carbon atoms. Preferably, the diolefins are chosen from non-conjugated aliphatic diolefins such as 4-vinylcyclohexene and 1,5-hexadiene, alicyclic diolefins having an endocyclic bridge such as dicyclopentadiene, methylene- and ethylidenenorbornene, and conjugated aliphatic diolefins such as 1,3-butadiene, isoprene and 1,3-pentadiene. The process according to the invention appears to perform particularly well for the manufacture of homopolymers of propylene.

The total quantity of olefin used in the process according to the invention is most often such that the total partial pressure is at least equal to atmospheric pressure, for example about at least 0,2 MPa; this pressure is in general at the most equal to 2 MPa, preferably at the most 1 MPa.

The process according to the invention has the advantageous characteristic of increasing the catalytic activity and consequently of increasing the productivity of the polyolefins formed and of reducing the presence of catalytic residues into the polyolefins.

The process according to the invention is particularly outstanding for the manufacture of homopolymers of propylene which are characterized in general by a high melting temperature conferring them a high heat stability. The melting temperature of the polypropylene obtained by the process according to the invention is generally at least equal to 95° C., especially at least equal to 100° C., values of at least 110° C. being preferred; the melting temperature is most often at the most equal to 160° C., in particular at the most 155° C., values of at the most 150° C. being the most common.

The process according to the invention also makes it possible to obtain highly syndiotactic polypropylene. The syndiotactic pentad fraction [rrrr] measured by $^{13}C$ nuclear magnetic resonance is in general at least equal to 0,91, especially at least 0,92; the syndiotactic pentad fraction [rrrr] is currently at the most equal to 0,96, values of at the most 0,95 being advantageous.

The process according to the invention is further suitable for the manufacture of polypropylene with a relatively high crystalline fraction $f_C$ conferring good mechanical properties. The crystalline fraction $f_C$ measured by X-ray diffraction is generally at least 25%, the preferred values being at least 30%; the crystalline fraction $f_C$ is currently at the most equal to 50%, especially at the most 45%.

Furthermore, the polypropylene obtained by the process according to the invention has generally a viscosity-average molecular weight $M_v$ measured by viscometry of at least 60,000, especially at least 70,000; most often $M_v$ does not go beyond 200,000, in particular 150,000.

The invention consequently also relates to syndiotactic polypropylene having at least one of the abovementioned properties.

EXAMPLES

The examples described below serve to illustrate the invention in these examples propylene was polymerized in a suspension process using rac-2,2-dimethylpropylidene($1$-$\eta^5$-cyclopentadienyl)($1$-$\eta^5$-fluorenyl)dichlorozirconium to form syndiotactic polypropylene. The meanings of the symbols used in these examples, the units expressing the parameters mentioned and the methods of measurement of these parameters are explained below.

$\alpha$=catalytic activity expressed in grams of polyolefin obtained per hour and per mol of rac-2,2-dimethylporpylidene($1$-$\eta^5$-cyclopentadienyl)-($1$-$\eta^5$-fluorenyl)dichlorozirconium used, and divided by the molar concentration of the olefin in the hydrocarbon diluent.

$M_v$=viscosity-average molecular weight of the polyolefin defined by the relationship $\eta=1{,}10\times10^{-4} M_v^{0,80}$ wherein $\eta$ denotes the intrinsic viscosity of the polyolefin measured in decalin at 135° C. with the aid of a UBBELOHDE viscosimetry tube.

$T_p$=polymerization temperature expressed in °C.

$T_m$=melting temperature of the polyolefin expressed in °C. and measured by differential scanning calorimetry with a PERKIN-ELMER®DSC IV system.

[mrr]=syndiotactic pentad fraction of the polyolefin measured by $^{13}$C nuclear magnetic resonance (NMR). NMR spectra were obtained with a VARIAN® spectrometer.

$f_C$=crystalline fraction of the polyolefin measured by X-ray diffraction with a SIEMENS®D-500 diffractometer using a Ni-filtered Cu K$\alpha$ X-ray beam excited at 40 kV. Further details of the methods of measurement of the parameters $T_m$, [mrr] and $f_C$ are described in "Degree of stereochemical control of rac-Et[Ind]$_2$ZrCl$_2$/MAO catalyst and properties of anisotactic polypropylenes", Macromolecules, Vol. 23, 3559–3568, 1990.

Examples 1 to 4 (in accordance with the invention)

Toluene saturated with propylene was introduced into a polymerization vessel equipped with a magnetic stirred bar. The temperature was raised at the polymerization temperature $T_p$ shown in Table I. Then methylaluminoxane was first introduced into the vessel, then a solution of rac-2,2-dimethylpropylidene($1$-$\eta^5$-cyclopentadienyl)($1$-$\eta^5$-fluorenyl)dichlorozirconium in toluene (with a concentration of Zr equal to 50 µM) was injected into the vessel. The quantities introduced were such that the molar ratio Al/Zr was equal to 2500. Propylene was introduced such that his partial pressure in the polymerization vessel was equal to 0,1 MPa. Polymerization was quenched by the addition of methanol into the vessel. The recovered polypropylene was washed with methanol and dried in vacuo at 50° C. The properties of the polymer are shown in table I.

TABLE 1

| N° Ex. | $T_p$ | $\alpha.10^{-6}$ | $T_m$ | $M_v$ | [mrr] | $f_c$ (%) |
|---|---|---|---|---|---|---|
| 1 | 60 | 4,25 | 97,3; 111,0 | 61000 | — | 29,6 |
| 2 | 30 | 2,15 | 130,5; 139,7 | 91000 | 0,92 | 35,4 |
| 3 | 0 | 0,42 | 143,2; 148,1 | 169000 | 0,95 | — |
| 4 | −20 | 0,12 | 148,0 | 199000 | — | 45,4 |

Examples 5 and 6 (given by way of comparison)

The operations of example 1 were repeated using dimethylmethylene($1$-$\eta^5$-cyclopentadienyl)($1$-$\eta^5$-fluorenyl)dichlorozirconium instead of rac-2,2-dimethylpropylidene($1$-$\eta^5$-cyclopentadienyl)($1$-$\eta^5$-fluorenyl)dichlorozirconium. The results obtained are shown in Table II.

TABLE II

| N° Ex. | $T_p$ | $\alpha.10^{-6}$ |
|---|---|---|
| 5 | 60 | 0,57 |
| 6 | 30 | 1,23 |

A comparison of the results of examples 5 and 6 respectively with those of examples 1 and 2 reveals the progress brought about by the invention as regards the catalytic activity of the polymerization process.

What we claim is:

1. A process for a preparation of a homopolymer of propylene by polymerization of propylene said process, comprising: contacting propylene with a metallocene and a cocatalyst, wherein the metallocene is rac-2,2-dimethylpropylidene($1{,}\eta^5$-cyclopentadienyl)($1$-$\eta^5$-fluorenyl)dichlorozirconium, and the cocatalyst is an aluminoxane and wherein the polymerization is carried out in suspension in a hydrocarbon diluent at a temperature from 30° to 60° C. and at metallocene and cocatalyst quantities such that a molar ratio Al/Zr is from 500 to 4000.

2. The process according to claim 1, wherein the cocatalyst is selected from the group consisting of linear compounds of formula

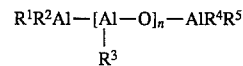

wherein $R^1$, $R^2$, $R^3$, $R^4$ and $R^5$ each represent an alkyl group containing up to 18 carbon atoms and $1 \leq n \leq 50$.

3. The process according to claim 1, wherein the metallocene is used in a form of a solution.

4. The process according to claim 1, wherein the metallocene is deposited on an inorganic or polymeric support.

5. The process according to claim 1, wherein the hydrocarbon diluent is selected from the group consisting of liquid aliphatic, cycloaliphatic and aromatic hydrocarbons.

6. The process according to claim 5, wherein the hydrocarbon diluent is toluene.

7. The process according to claim 1, wherein the aluminoxane is methylaluminoxane.

8. The process according to claim 1, wherein the Al/Zr molar ratio is from 1000 to 3500.

* * * * *